United States Patent [19]

Parker

[11] Patent Number: 4,498,516
[45] Date of Patent: Feb. 12, 1985

[54] TUBELESS TIRE BEAD SEATER AND METHOD OF EMPLOYING THE SAME

[76] Inventor: Hugh M. Parker, 718 Cherokee St., Talladega, Ala. 35160

[21] Appl. No.: 580,104

[22] Filed: Feb. 14, 1984

Related U.S. Application Data

[63] Continuation of Ser. No. 346,849, Feb. 8, 1982, abandoned.

[51] Int. Cl.³ .............................................. B60C 25/00
[52] U.S. Cl. ..................................................... 157/1.1
[58] Field of Search ...................................... 157/1, 1.1

[56] References Cited

U.S. PATENT DOCUMENTS 3,081,816 3/1963 Branick .................................. 157/1.1
3,596,698 8/1971 Jordan .................................... 157/1.1
3,651,849 3/1972 Kaminskas ........................... 157/1.1

Primary Examiner—James G. Smith
Attorney, Agent, or Firm—Woodford R. Thompson, Jr.

[57] ABSTRACT

A tubeless tire bead seater and method of employing the same embodies a resilient, inflatable, endless tubular member which is adapted to be placed within an annular gap between a tire bead and its adjacent wheel rim flange. The construction and arrangement of the tubular member is such that in response to inflation of the tubular member, its inner circumference expands radially and inwardly toward the wheel rim flange to fill the annular gap and form a fluid-tight seal. After the seal is made, air under pressure is introduced into the tire to inflate it and force the tire bead against the adjacent wheel rim flange as the tubular member is forced out of the annular gap.

4 Claims, 13 Drawing Figures

TUBELESS TIRE BEAD SEATER AND METHOD OF EMPLOYING THE SAME

This is a continuation of application Ser. No. 346,849, filed Feb. 8, 1982, now abandoned.

BACKGROUND OF THE INVENTION

This invention relates to a device for seating a tubeless tire on its wheel rim and more particularly to an improved device having a resilient inflatable, tubular member which is adapted to form a fluid-tight seal between a tire bead and its adjacent wheel rim flange in a manner which permits the tire to seat on its rim in response to introduction of air under pressure into the tire.

Heretofore in the art to which my invention relates, various devices have been proposed for seating tubeless tires on the rims of vehicles such as trucks, automobiles and the like. Such prior art devices have included a flat, belt-type bead seater which is wrapped around the tread of a tire and then is inflated to force the tire beads against their wheel rim flanges. A device of this type is inefficient and difficult to use due to the fact that airtight seals are not always formed between the tire beads and their adjacent wheel rim flanges. Also, ring-like tubular members having inwardly directed discharge openings have been employed to seat tubeless tires on their rims. Such tubular members are placed above the annular gap between the bead of a tire and the ledge portion of the wheel rim flange adjacent thereto and air under pressure is discharged from the discharge openings into the annular gap to provide sufficient air for the tire to be seated on its rim. Excessive noise is thus created by this discharge of air under pressure. Such discharge of air also blows loose particles of dirt and grit into the surrounding atmosphere, thus creating unsafe conditions. Accordingly, safety glasses are needed to prevent injury to the user. Furthermore, such ring-like members must be firmly held to prevent them from being propelled toward the operator and thus cause injury to the operator.

Flexible rubber doughnut-type bead seaters have also been employed to seat radial, bias-belted and other conventional tubeless tires on their rims. Such doughnut-type bead seaters have been unsatisfactory due to the fact that they have short lives in that they grow outwardly in diameter or stretch with age and use and thus lose their sealing ability. Also, they are easily damaged during removal from the annular gap between the bead of the tire and its adjacent wheel rim flange. That is, burrs and nicks on the wheel rim flange often cut the doughnut-type bead seater as air under pressure is introduced into the tire to force it out of the annular gap. Furthermore, such bead seaters often are caught between the annular outturned lip of the rim flange and the tire bead whereby the operator must either deflate the tire to remove the bead seater or take the chance of destroying the bead seater in attempting to dislodge the same.

Other methods employed to seat tubeless tires on their rims include spraying ether into the gap between the tire bead and the wheel rim flange in an attempt to get some of the ether inside the tire. The ether is then ignited causing a small, uncontrolled explosion which causes gas to be introduced into the tire and thus seat it on its rim. Such an uncontrolled explosion is very dangerous and subjects the person mounting the tire to injury.

Other conventional mechanical and pneumatic tubeless tire bead seaters with which I am familiar are disclosed in U.S. Pat. No. 3,974,005 and No. 4,019,553.

SUMMARY OF THE INVENTION

In accordance with my invention, I overcome the above and other difficulties by providing an improved tubeless tire bead seater which is simple to operate and durable of construction, economical of manufacture and one which is efficient, safe and easy to use.

An object of my invention is to provide a bead seater which, upon controlled pressurization, expands radially inwardly to grip the wheel rim flange and form a fluid-tight seal between the bead of a tire and its adjacent wheel rim flange and is forced out of the annular gap between the tire bead and its wheel rim flange as air under pressure is introduced into the tire.

Another object of my invention is to provide a bead seater of the character designated which will overcome the difficulties heretofore encountered with cuts in the bead seater caused by nicks and burrs on the wheel rim flange. That is, my device has the unique ability to expand radially inwardly to grip the rim flange thereby closing such cuts. With my improved bead seater, cross sectional roundness and firmness are inherent to its design due to internal pressure stresses. Therefore, the bead seater will not be partially caught between the wheel rim flange and the tire bead when ejected. Age and use deficiencies of conventional bead seaters are overcome by my improved design due to inward movement of the bead seater upon inflation.

My improved device embodies a resilient, inflatable, endless tubular member which is adapted to be placed within the annular gap between the bead of a tire and its adjacent wheel rim flange. The tubular member is constructed and arranged so that, in response to inflation of the tubular member to a pressure to form a fluid-tight seal, its inner circumferential surface expands radially inwardly toward the adjacent wheel rim flange and engages the same to seal the annular gap between the wheel rim flange and the adjacent tire bead. A fluid supply conduit having control means therein communicates with the tubular member for selectively controlling the inflation and deflation thereof.

DESCRIPTION OF THE DRAWINGS

Apparatus embodying features of my invention is illustrated in the accompanying drawings, forming a part of this application, in which.

DETAILED DESCRIPTION

Figure 1:
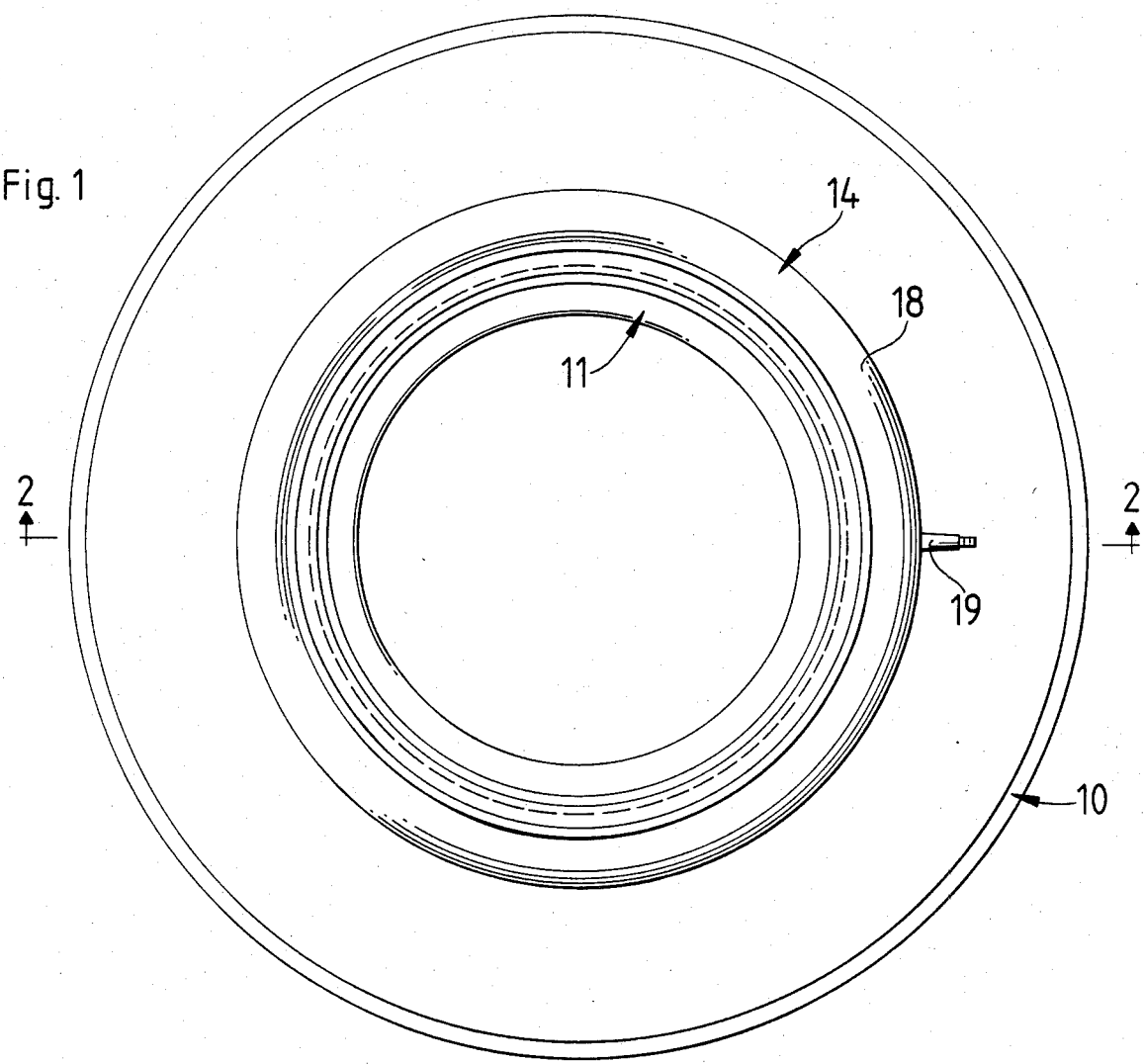
FIG. 1 is a top plan view showing my improved bead seater positioned on a pneumatic tire, with the tire extending in a horizontal plane.
Figure 2:
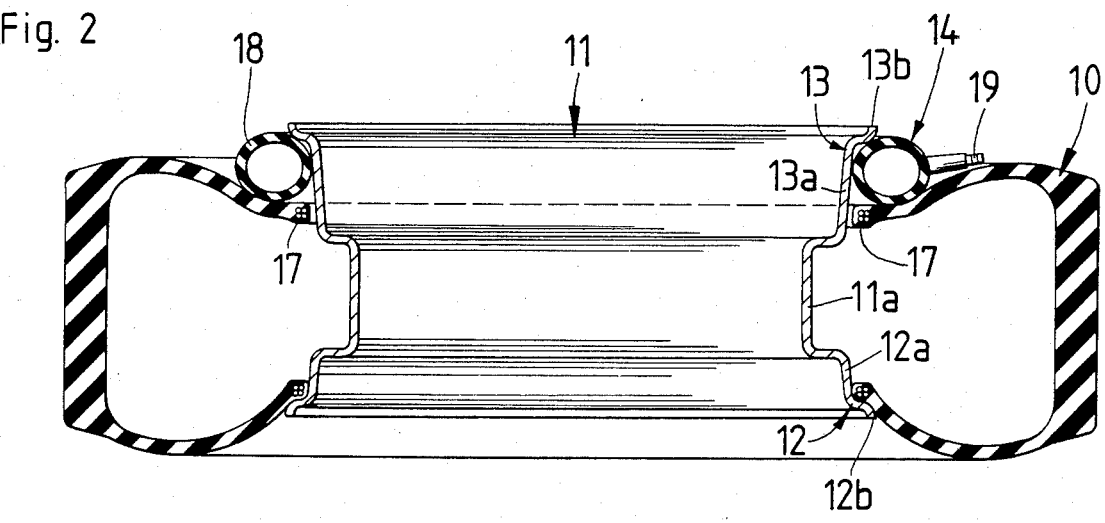
FIG. 2 is a sectional view taken generally along the line 2—2 of FIG. 1 showing my bead seater in the annular gap between the tire bead and the adjacent wheel rim flange.
Figure 8:
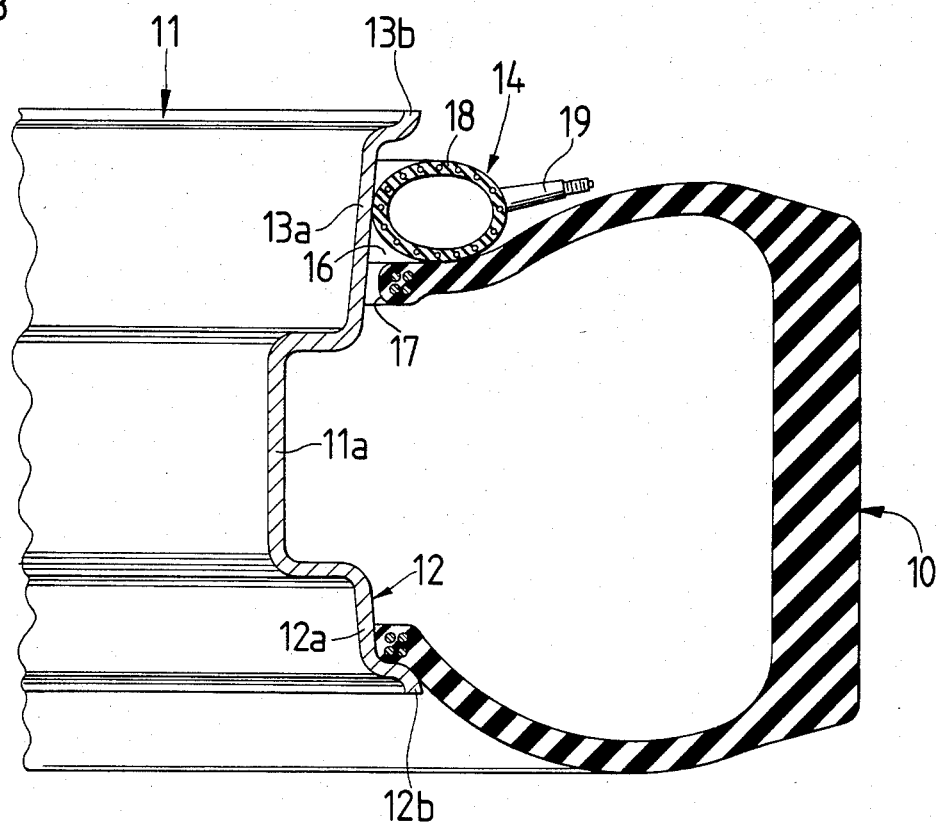
FIG. 8 is an enlarged, fragmental, sectional view showing my improved inflated tubular member forming a fluid-tight seal in the annular gap between the tire bead and the wheel rim flange.

Referring now to the drawings for a better understanding of my invention, I show in FIGS. 1, 2 and 8 a deflated tubeless tire 10 mounted on a conventional wheel rim 11. The wheel rim 11 includes the usual drop center portion 11a, a short ledged wheel rim flange 12 and a long ledged wheel rim flange 13, as shown. The wheel rim flanges 12 and 13 include inclined ledge portions 12a and 13a, respectively, which extend outwardly from the drop center portion 11a and terminate in annular outturned lips 12b and 13b, respectively, as shown in FIGS. 2 and 8. The rim 11 is formed of a suitable durable material such as steel, aluminum and the like. My improved device, indicated generally at 14, is adapted to be placed in the annular gap 16 between a tire bead 17 and its adjacent wheel rim flange 13. However, it will be apparent that my improved device 14 will be adapted for use in the annular gap formed by either of the wheel rim flanges 12 or 13.

My improved device embodies a resilient, inflatable, endless tubular member 18 which is formed of a suitable resilient material such as a rubber-like material and is shaped in the form of an annular member, as shown. A conventional valve 19 is formed integrally with the tubular member 18 to control inflation and deflation of the tubular member 18.

Figure 7:
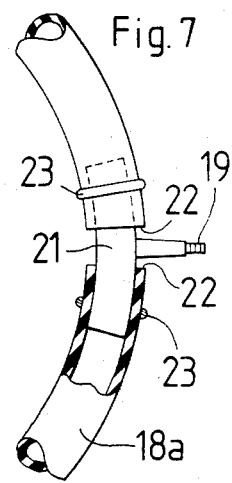
FIG. 7 is a fragmental view, partly in section, showing valve means for inflating and deflating the tubular member.

Instead of forming the valve 19 integrally with the resilient tubular member 18, it may be carried by a sleeve 21 which is inserted in the ends 22 of a resilient, tubular member 18a, as shown in FIG. 7. Suitable clamps 23 may be employed to secure the tubular member 18a to the sleeve 21. While I have shown the tubular members 18 and 18a as being inflated and deflated through the valve 19, it will be apparent that this may be accomplished by other means.

Figure 3:
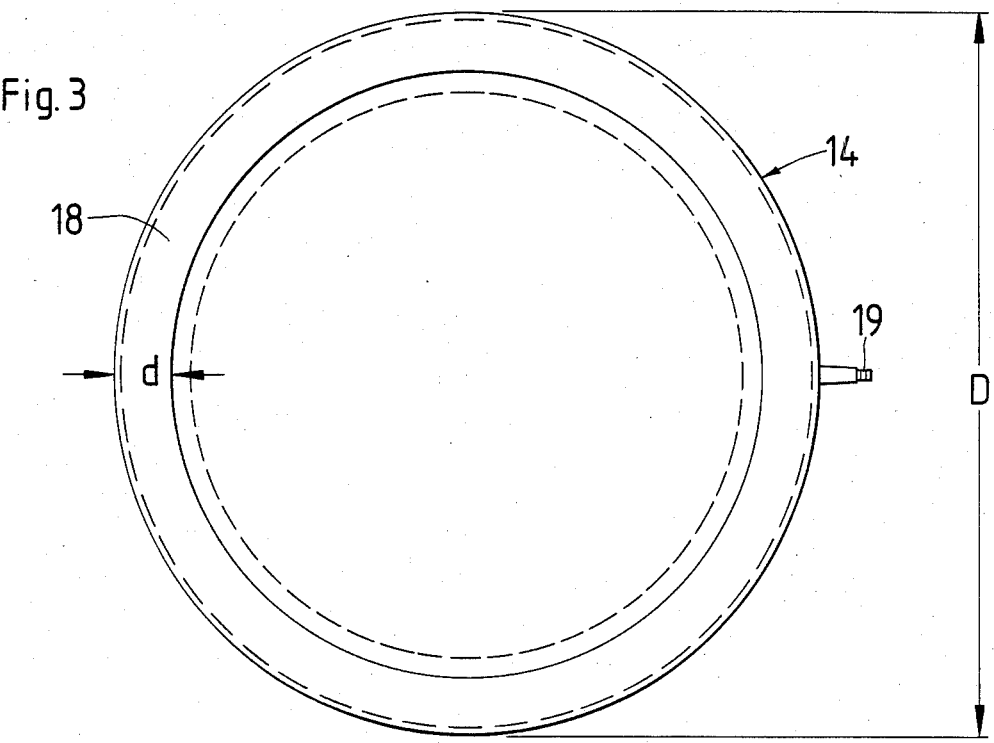
FIG. 3 is a top plan view showing the deflated configuration of my bead seater in solid lines and its inflated configuration in dotted lines.
Figure 10:
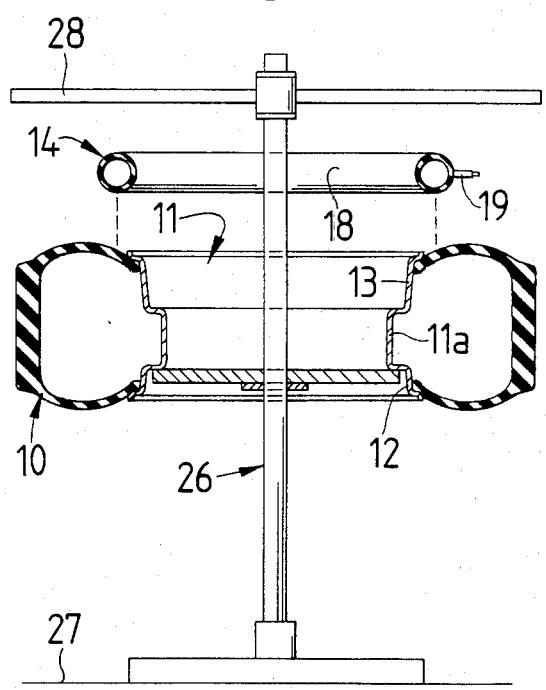
FIG. 10 is an elevational view, corresponding to FIG. 9, showing the bead seater being ejected from the annular gap between the tire bead and its wheel rim flange.

In FIGS. 2 and 8, I show the tubular member 18 or 18a, as the case may be, positioned in the annular gap 16 between the tire bead 17 and the wheel rim flange 13. The tubular member is inflated after insertion into the annular gap 16 to a pressure which expands its cross sectional area, as shown in FIG. 8, simultaneously with radial and inward movement of its inner and outer circumferences, as shown by the dotted line configuration of the tubular member in FIG. 3. This unique ability of the tubular members 18 and 18a to shrink radially and inwardly causes the inner circumferential surface of the tubular member to grip the ledge portion 13a of the wheel rim flange and form a fluid-tight seal between the tire bead 17 and the adjacent ledge portion of the wheel rim flange, shown in FIG. 8. Air under pressure is then introduced into the tire 10 to inflate it and force the tire bead 17 toward and into sealing relation with the annular outturned lip 13b of the wheel rim flange 13. As the tire bead 17 travels along the inclined ledge portion 13a of the flange 13, it forces the tubular member 18 or 18a, as the case may be, out of the annular gap 16, as shown in FIG. 10.

Shrinkage of the tubular members 18 and 18a is controlled by the amount of pressure created within the bead seater. This shrinkage of the tubular members causes sealing contact with the wheel rim flange and the tire bead 17, as shown in FIGS. 2 and 8, and determines the amount of force required to expel the bead seater from the annular gap 16. This expulsion force is produced by tire pressurization and expansion. That is, as pressure is introduced into the tire, the tire bead 17 moves outwardly along the ledge portion 13a and applies force against the bead seater. As pressure continues to increase within the tire, sufficient expansion force is created to overcome the gripping force of the bead seater on the wheel rim flange. At this point, sufficient pressure is contained within the tire to seat the bead 17 against the annular lip 13b, as shown in FIG. 10. The bead seater is ejected due to the expansion force within the tire. The ejection of the bead seater occurs at a rapid rate which is sufficient to minimize air escaping from the tire.

In the event nicks or burrs on the wheel rim flange 13 should cut the resilient tubular member as it is forced out of the annular gap 16, the unique ability of my improved tubular member to shrink radially and inwardly against the rim flange will close such cuts and maintain the fluid-tight seal.

The tubular members 18 and 18a are in the form of a resilient member which, in response to being inflated under normal operating conditions between a conventional tire and rim, will have a poisson's ratio of at least substantially 0.55. In actual practice I have found that a suitable inflated tubular member having this minimum poisson's ratio will seat a tubeless tire on its rim satisfactorily in every respect. However, I prefer using an inflated, resilient tubular member having a poisson's ratio of at least substantially 0.60 due to the fact that it will expand in cross sectional area and shrink in circumference with less bead seater pressure than an inflated tubular member having a minimum poisson's ratio of approximately 0.55. From the foregoing it will be seen that the greater the poisson's ratio of the inflated tubular member, the greater its ability to shrink in cirucmference and grip the wheel rim flange.

Poisson's ratio for an inflated resilient tubular member shaped in an annular configuration may be defined herein as being the ratio of the changes in length of its cross sectional diameter, d, to the changes in length of its outer circumferential diameter, D. In other words, poisson's ratio for an inflated resilient tubular member may be defined by the foregoing simple expression, $$u = \frac{\Delta d/d}{\Delta D/D}$$

wherein Δd represents the changes in length of the cross sectional diameter and ΔD represents the changes in length of the outer circumferential diameter. It will be understood that the changes in length of the cross sectional diameter d occur transversely to the changes in length of the outer circumferential diameter D.

As stated in Timoshenko's 3rd Edition of "Strength of Materials", Vol. One, poisson's ratio, u, for materials in the elastic range may be defined in terms of stress and strain components by the following well known equation:

$$u = \frac{\sigma \text{ axial} - \epsilon \text{ axial } (E)}{\sigma \text{ hoop}}$$

wherein σ axial is the stress applied to the tubular member 18 parallel with its longitudinal axis, σ hoop is the stress applied to the cross sectional circumference of the tubular member in a plane perpendicular to the longitudinal axis of the tubular member, ε axial is the strain applied to the tubular member in the axial direction and E is Young's Modulus of Elasticity. It will thus be seen that σ axial and σ hoop in terms of the tubular members cross sectional diameter d, wall thickness t and the internal pressure P introduced therein may be expressed in the following well known equations:

$$\sigma \text{ axial} = \frac{Pd}{4t}$$

$$\sigma \text{ hoop} = \frac{Pd}{2t}$$

Figure 11:
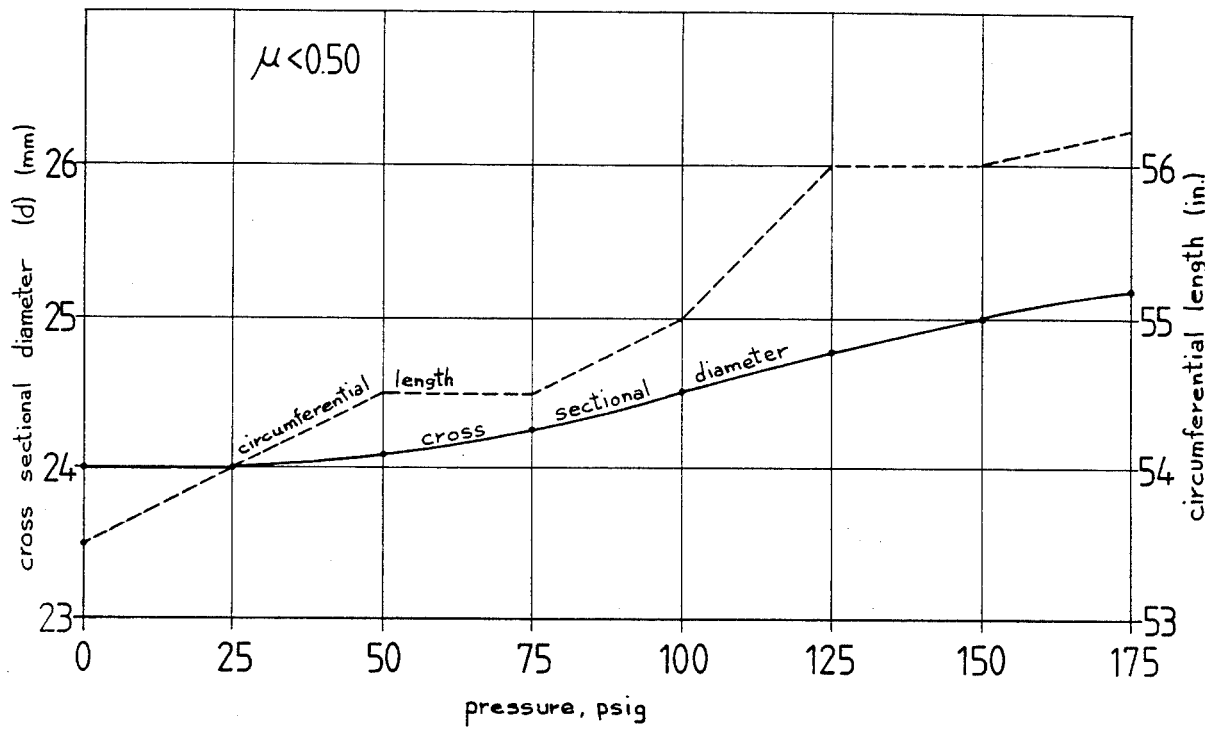
FIG. 11 is a graph plotting the growth in cross sectional diameter and the circumferential length of a conventional inflated hose having a poisson's ratio less than 0.50.

From the above, I have found that an inflated tubular member having a poisson's ratio of less than 0.5 expands radially and outwardly in both its outer circumferential diameter D and its cross sectional diameter d. The graph in FIG. 11 shows actual test results of the deformational changes in a conventional inflated tubular member having a poisson's ratio of less than 0.50. From FIG. 11, it will be apparent that as pressure within a conventional tubular member is increased, both its cross sectional diameter d and its circumferential length increases.

The expansion in both of these directions thus prevent conventional inflated tubular members having poisson's ratio of less than 0.50 from forming a satisfactory seal in the annular gap 16. That is, the expansion in these directions may force a conventional tubular member from the annular gap 16 before it can grip the wheel rim flange.

Figure 12:
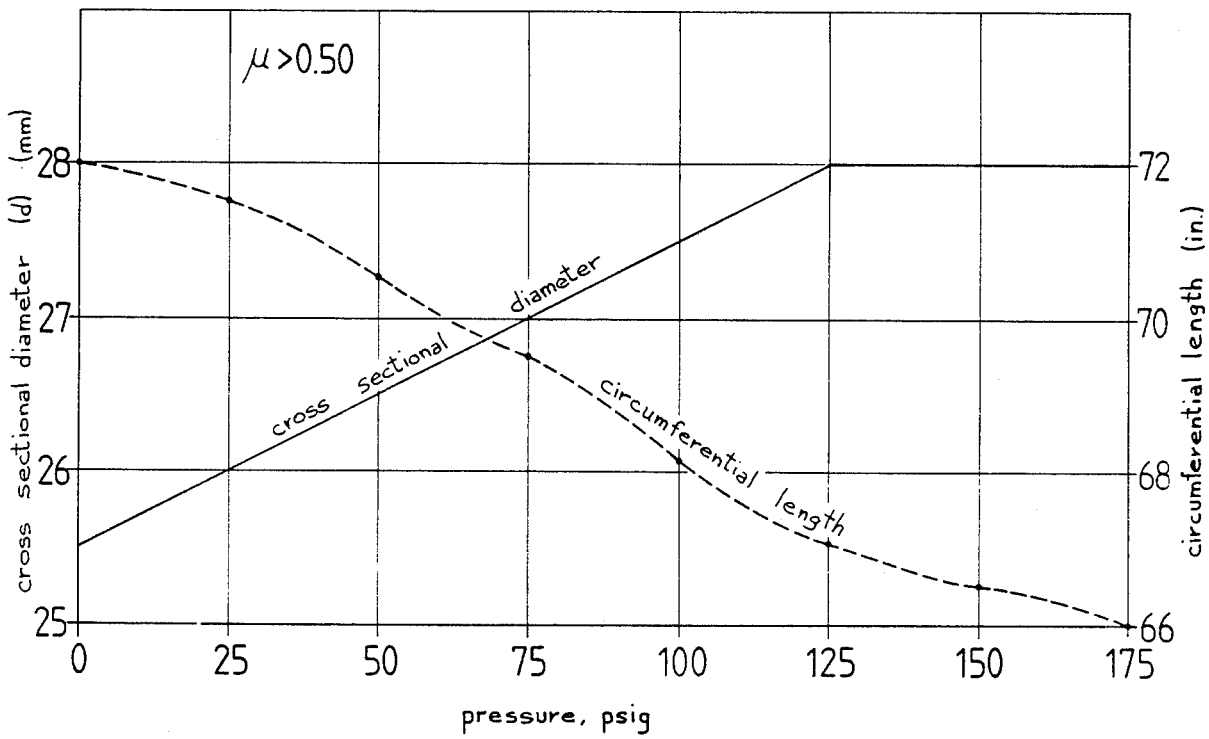
FIG. 12 is a graph plotting the decrease in circumferential length and growth of the cross sectional diameter of an inflated tubular member having a poisson's ratio of approximately 0.95.

The graph in FIG. 12 shows actual test results of the deformational changes in an inflated tubular member having a poisson's ratio above 0.50. From this graph, it will be seen that as internal pressure is increased, the tubular member's circumferential length decreases as its cross sectional diameter d increases. This unique shrinking ability of an inflated tubular member having a poisson's ratio above 0.50 permits the tubular member to positively grip the wheel rim flange and form a fluid-tight seal between the adjacent wheel rim flange and its tire bead 17.

Figure 4:
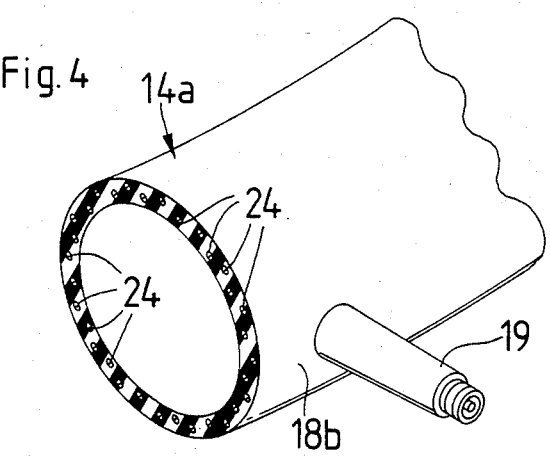
FIG. 4 is an enlarged, fragmental, perspective view, partly in section, showing another embodiment of my invention in which braided reinforcement means is provided in the bead seater.

In FIG. 4 I show another embodiment of my improved bead seater indicated generally at 14a. This embodiment includes a resilient, inflatable, endless tubular member 18b having a poisson's ratio above 0.55. This embodiment includes braided reinforcement, indicated at 24, which is formed integrally within the tubular member 18b, as shown. After the tubular member 18b is placed between the tire bead 17 and the adjacent wheel rim flange, it is inflated to form a fluid-tight seal therebetween. As air is introduced in the tire 10, the tire bead 17 is forced against the adjacent wheel rim flange and the bead seater 14a is forced out of the annular gap 16.

Figure 9:
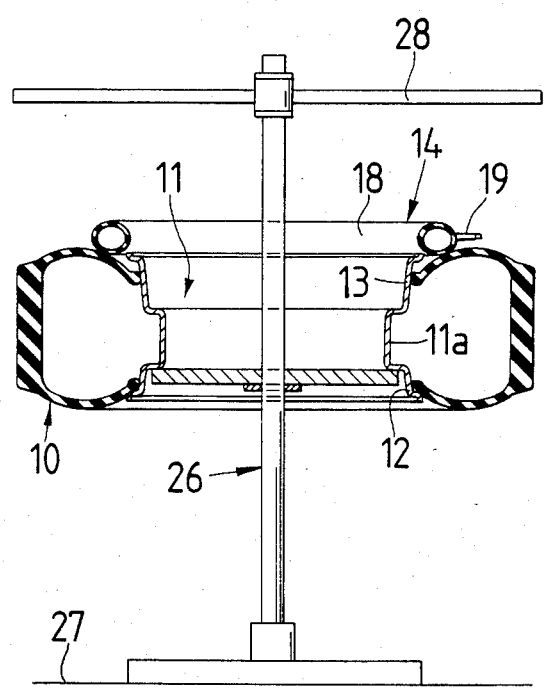
FIG. 9 is an elevational view, partly in section, showing the tire mounted on its rim which in turn is supported by a wheel rim support stand.

In FIGS. 9 and 10, I show a conventional wheel rim support stand 26 which is adapted to support the tire 10 on its rim 11 above a supporting surface 27. A safety bar 28 is provided above the tire 10 to prevent injury to the operator as the tubular member 18, 18a or 18b, as the case may be, is forced out of the annular gap 16, as shown in FIG. 10.

From the foregoing description, the operation of my improved bead seater will be readily understood. A deflated tubeless tire 10 mounted on its rim 11 is placed on the support stand 26 with the short ledged flange 12 preferably facing the supporting surface 27, as shown. It will be understood that the deflated bead seater 14 or 14a, as the case may be, and the rim flange 13 are lubricated in a manner well understood in the art to which my invention relates. The bead seater is then placed in the annular gap 16 between the flange 13 and its adjacent tire bead 17. The safety bar 28 is then assembled over the tire 10, as shown. My improved tubular member 18, 18a or 18b, as the case may be, is then inflated to a pressure which expands its cross sectional area and shrinks its inner and outer circumference to fill the annular gap 16 and form a fluid-tight seal between the tire bead 17 and the ledge portion 13a of the wheel rim flange 13. Air is then introduced into the tire 10 to inflate it and also to force the bead 17 against the wheel rim flange 13 whereby the tire is seated on its rim 11 and the bead seater 14 or 14a, as the case may be, is forced out of the annular gap 16. The safety bar 28 is then removed so that the inflated tire 10 may be removed in the usual manner.

The tire pressure which produces bead seating can be regulated by presetting the pressure within the seater. A low seating pressure may be desirable; however, should greater pressure be required for some tires, an adjustment can be made. This adjustment would simply be to preset pressure within the seater to a higher value.

Figure 5:
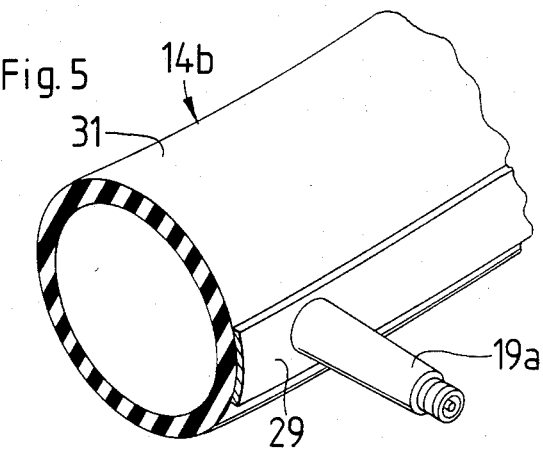
FIG. 5 is a fragmental perspective view corresponding to FIG. 4 showing another form of my improved bead seater.
Figure 6:
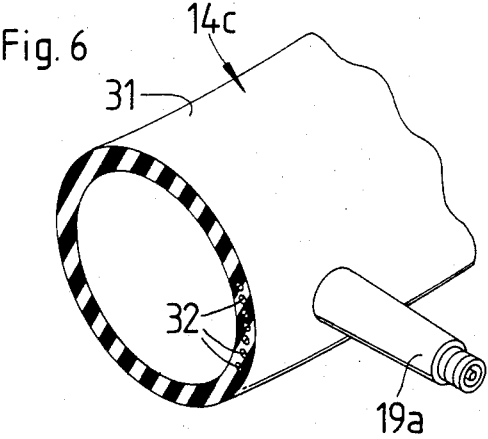
FIG. 6 is a fragmental, perspective view corresponding to FIGS. 4 and 5 showing a further modified form of my invention.
Figure 13:
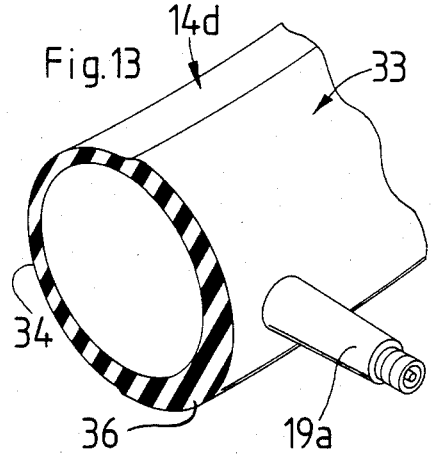
FIG. 13 is a fragmental, perspective view corresponding to FIGS. 4, 5 and 6 showing another modified form of my invention.

Referring now to FIGS. 5, 6 and 13, I show three modified forms of my improved bead seater indicated generally at 14b, 14c and 14d, respectively. The bead seater 14b includes an annular non-resilient band-like retainer member 29 such as metal which is carried by the outer circumferential surface of a resilient, inflatable, endless tubular member 31. The tubular member 31 may be formed from a suitable rubber-like material which, upon inflation, has a poisson's ratio of less than that of my bead seater 14 described hereinabove. The band-like member 29 limits expansion of the tubular member 31 outwardly and radially. That is, after the base seater 14b is placed in the annular gap 16 and inflated through a valve 19a, only the inner circumferential portion of the tubular member 31 expands radially and inwardly toward the wheel rim flange and in a direction to form a fluid-tight seal in the annular gap 16. That is, the outer circumferential portion is held in place by the non-resilient band-like member 29 while the inner circumferential portion is free to expand. As air under pressure is introduced into the tire 10, the tire bead 17 is forced outwardly along the ledge portion 13a and then against the annular outturned lip 13b of the wheel rim flange 13. The movement of the tire bead 17 also forces the tubular member 31 out of the gap 16 in the same manner as described above.

The bead seater 14c embodies a tubular member having a plurality of annular retainer members 32 which are formed integrally with the outer circumferential portion of the tubular member 31, as shown in FIG. 6. The retainer members 32 may be in the form of cables, cords or the like which limit outward expansion of the outer circumference of the tubular member 31. After the bead seater 14c is placed in the annular gap 16 and inflated through the valve 19a, the inner circumferential portion of the tubular member 31 expands radially and inwardly toward the wheel rim flange and in a direction to fill the annular gap 16. Air under pressure is then introduced into the tire 10 to force the tire bead 17 against the annular lip of the wheel rim flange and force the tubular member 31 out of the annular gap 16.

The bead seater 14d embodies a resilient, inflatable, endless tubular member 33 which is formed from a tubular member having different wall thicknesses, as shown in FIG. 13. The thinner portion of the tubular member, indicated at 34, forms the inner circumferential portion of the bead seater 14d while the thicker portion thereof, indicated at 36, forms the outer circumferential portion of the bead seater. The thicker portion 36 limits expansion of the tubular member 33 outwardly and radially while the inner circumferential portion 34 permits expansion radially and inwardly. The tubular member 33 may be formed from a suitable rubber-like material.

From the foregoing, it will be seen that I have devised an improved tubeless tire bead seater which has a unique ability to shrink circumferentially and form a fluid-tight seal between the bead of a tire and its adjacent wheel rim flange. This unique ability thus permits a tubeless tire to seat on its rim in a very efficient, safe and reliable manner. A bead seater may thus be made from a rugged and durable material which reduces damage to the bead seater while in use. Furthermore, by providing a bead seater which shrinks circumferentially, any cuts in its inner circumferential surface resulting from nicks and burrs on the wheel rim flange will be closed to form and maintain a fluid-tight seal in the annular gap.

While I have shown my invention in several forms, it will be obvious to those skilled in the art that it is not so limited but is susceptible of various other changes and modifications without departing from the spirit thereof.

What I claim is:

1. A device for seating a tubeless, pneumatic tire on a wheel rim having outwardly extending inclined ledge portions terminating in annular outturned lips comprising:
    (a) a resilient, inflatable, firm, reinforced endless tubular member having a poisson's ratio above 0.55 and adapted to be placed within an annular gap between a bead of a tire and an adjacent inclined ledge portion of said wheel rim and constructed and arranged so that upon inflation there is constrictive movement of said tubular member as it moves radially and inwardly relative to said adjacent inclined ledge portion and exerts a force radially and inwardly thereon as said tubular member moves into sealing engagement with said adjacent inclined ledge portion and said bead and fills said annular gap in response to inflation of said tubular member to a pressure to provide a fluid-tight seal between said bead and said adjacent inclined ledge portion,
    (b) means for inflating said tubular member to a pressure to provide said fluid-tight seal, and
    (c) means for inflating said tire after inflating said tubular member to said pressure to provide said fluid-tight seal so that said bead is moved outwardly along said adjacent ledge portion of said wheel rim and forces said tubular member outwardly of said annular gap.

2. A device for seating a tubeless, pneumatic tire on its rim as defined in claim 1 in which said tubular member is an inflated resilient member having a poisson's ratio above 0.60.

3. The method of seating a tubeless, pneumatic tire on a wheel rim having outwardly extending inclined ledge portions terminating in annular outturned lips, comprising the following steps in the sequence named:
    (a) placing the tire on its rim so that its beads are inside said outturned lips of said rim with one bead being in spaced relation to the adjacent lip of said wheel rim to define an annular gap between said one bead and an adjacent inclined ledge portion,
    (b) placing a firm, resilient, inflatable, reinforced endless tubular member in said annular gap with said tubular member having a poisson's ratio above 0.55 so that upon inflation of said tubular member there is constrictive movement of said tubular member as it moves radially and inwardly relative to said adjacent inclined ledge portion and exerts a force radially and inwardly thereon as it moves into sealing engagement with said adjacent inclined ledge portion and said bead to fill said annular gap,
    (c) inflating said tubular member to a pressure to form a fluid-tight seal between said one bead and said adjacent inclined ledge portion, and
    (d) inflating said tire after said fluid-tight seal is formed between said one bead and said adjacent inclined ledge portion to force said one bead outwardly along said adjacent inclined ledge portion and force said tubular member out of said annular gap.

4. The method of seating a tubeless, pneumatic tire on its rim as defined in claim 3 in which the poisson's ratio of the resilient inflated member is above 0.60.

* * * * *